UNITED STATES PATENT OFFICE.

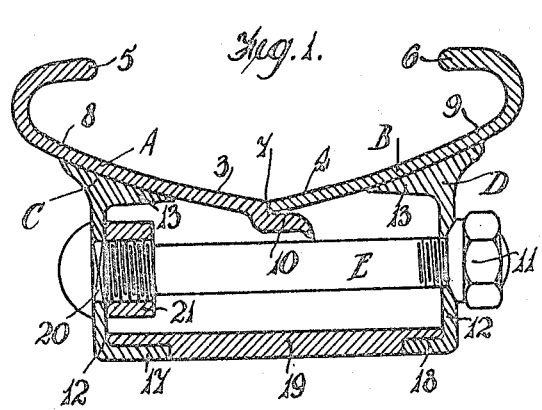
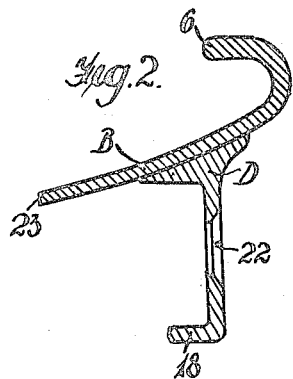
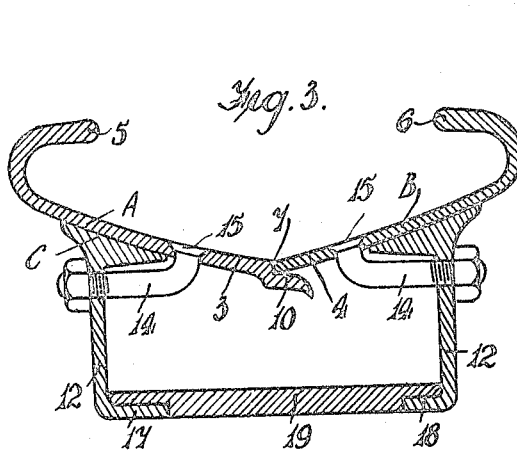
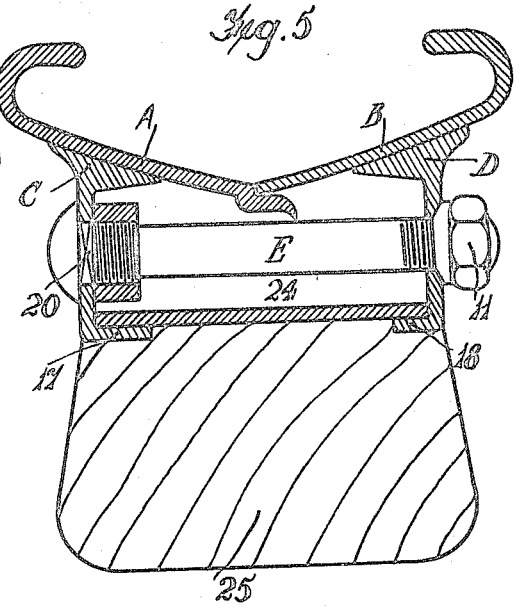

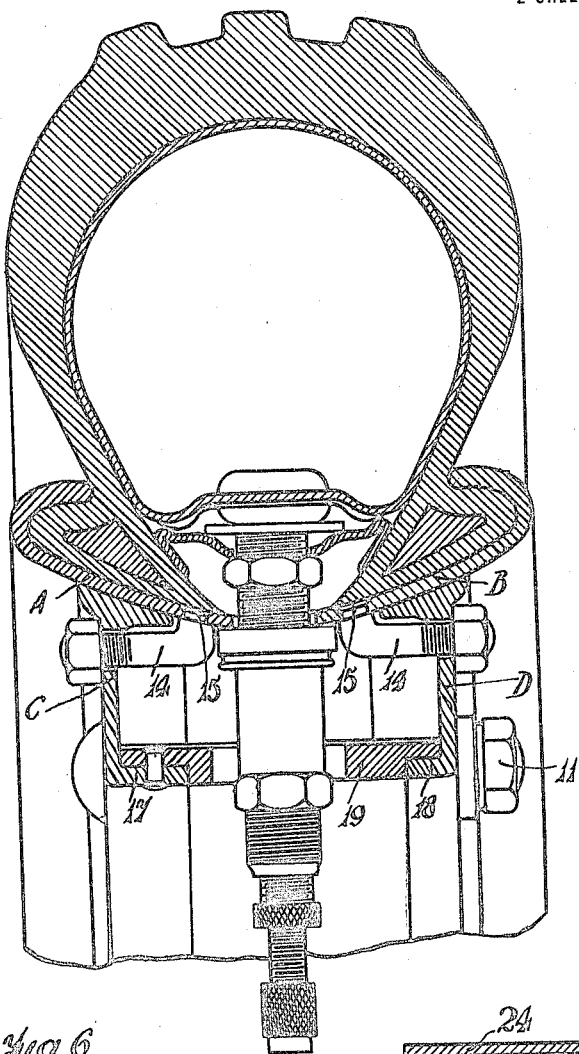
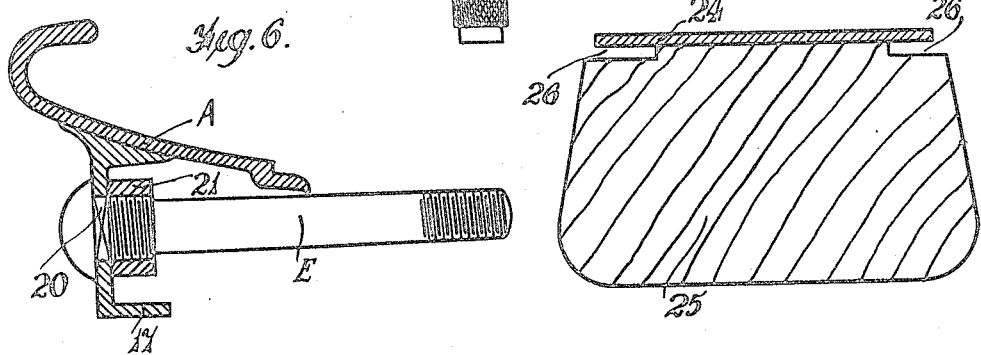

THOMAS JOHN HOBSON, OF BIRMINGHAM, ENGLAND.

DIVISIBLE WHEEL-RIM FOR PNEUMATIC TIRES.

1,299,943.  Specification of Letters Patent.  Patented Apr. 8, 1919.

Application filed July 3, 1918. Serial No. 243,133.

*To all whom it may concern:*

Be it known that I, THOMAS JOHN HOBSON, of 17 Chain Walk, Aston, Birmingham, in the county of Warwick, England, have invented new and useful Improvements in Divisible Wheel-Rims for Pneumatic Tires; and I do hereby declare the following to be a full, clear, and exact description of the same.

This invention has reference to that type of divisible wheel rim for pneumatic tires in which (in order to facilitate the removal of the air tube and outer cover) one half or part of the rim is made detachable from the other half or part of the rim which is fixed to the wheel.

My invention comprises an improved construction, combination and arrangement of the parts whereby the divisible wheel rim is rendered very strong and easy to make and the removal and refixing of the air tube and outer cover around the rim and the replacement of the detachable half or part of the rim is facilitated.

In the accompanying drawing, in which like parts are designated by similar reference characters throughout the several views:

Figure 1 is a cross sectional elevation of a divisible wheel rim for pneumatic tires constructed in accordance with this invention.

Fig. 2 is a cross sectional elevation of the detachable part of said wheel rim separately.

Fig. 3 is a cross sectional elevation of the same wheel rim taken at a different part of the circumference to the section shown in Fig. 1.

Fig. 4 is a cross sectional elevation showing the tire in position on the wheel rim.

This wheel rim shown in Figs. 1 and 4 is adapted more particularly for use with wire spokes;

Fig. 5 is a cross sectional elevation of substantially the same wheel rim but modified slightly for use with a wheel furnished with wooden felly.

Fig. 6 shows in cross section one part of the wheel rim separated from the wooden felly of the wheel and Fig. 7 is a cross section through the wooden felly and the bonding band which is shrunk around the same and is adapted for the attachment of the wheel rim shown in Fig. 5.

According to this invention the inturned edged trough section wheel rim is divided circumferentially at about the center and the two portions A, B of the rim forming the bottom of the trough are at 3, 4 inclined or coned from the turned in edges 5, 6 to the divisional line 7 so that the portions of the rim at the divisional line are of considerably smaller diameter than are the outer portions 8, 9 of the wheel rim on which the beaded edges of the outer cover of the pneumatic tire rest. This inclined or coned formation of the bottom of the trough is, as hereinafter described, to facilitate getting one beaded or wired edge of the outer cover on to the fixed portion A of the wheel rim and also to facilitate getting the detachable portion B of the wheel rim into the other beaded or wired edge of the outer cover. At the junction 7 where the two halves or portions A, B of the rim meet, the half or portion A of the rim is rabbeted and made to underlap the other portion B, this underlapping portion 10 being also preferably of taper formation that is of smaller diameter at its extreme edge than at the rabbeted edge 7 so as to facilitate the placing of the detachable portion B of the rim thereon. These two portions A, B of the rim are fixed to two trough section side rings C, D that is to say, each of the two side rings C, D has its web 12 outside in a plane about parallel with the plane of the wheel and also has a top flange 13 for the corresponding portion of the rim to fit on to and be there fixed by bolts or rivets or other suitable means.

The preferred means for fixing the two portions A, B of the rim to the corresponding trough section side rings C, D is by means of cranked bolts 14 (see Fig. 3) each of these bolts having one end 15 riveted in a hole in the rim part A or B, and the screw threaded end of the bolt being arranged to pass through a hole in the web part 12 of the ring C or D with the nut 16 on the outside. These bolts 14 are preferably arranged at say about six inches apart all around each side ring C, D so that when tightened up they effectually secure the portion A of the rim to the corresponding trough section side ring C, and also the portion B of the rim to the corresponding trough section side ring D. As the connection of these two portions A, B to the rings C, D is intended to be permanent the ends of the bolts 14 can be riveted over their nuts so as to prevent any possibility of their jarring loose. Each of the side rings C, D also has an inner flange marked respectively 17, 18 at its part of smallest diameter which fits within and embraces the rabbeted edges of a steel or other metal band 19 which is secured by rivets or by other suitable means to the inner flange 17 of the trough section side ring C and in the case of a wheel made with wire spokes the spoke nipples are passed through holes in this band 19. Thus the complete rim with the two side rings C, D and the band 19 are together of a hollow box like section. Any convenient number of bolts such as E pass through the two side rings C, D and thus secure the combined detachable portion B of the rim and side ring D to the other portion A of the rim and side ring C and to the intermediate bonding band 19. These bolts E are preferably arranged say at about six inches apart around the rim and they are permanently fixed to the ring C as for instance by each bolt having a head and a square neck 20 which fits in a square hole in the side ring C and is there secured by a nut 21 on the threaded part of the bolt within the channel ring C, these bolts passing through holes 22 in the removable ring D which is at the front of the wheel with nuts 11 on the outside. When the nuts 11 have been removed from the bolts E the removable side ring D with the removable half or part rim B fixed thereto can be removed leaving the air tube free to be removed from the outer cover and the latter can then be removed from the fixed portion A of the rim.

The outer cover of the pneumatic tire can readily be replaced on the fixed half or portion A of the rim owing to the portion of the rim at the division 7 being as aforesaid of considerably smaller diameter than the interior of the beaded or wired edge of the outer cover which is of the proper size to fit on the larger portions 8, 9 of the rim and when this has been done and the air tube placed in the outer cover the detachable part B of the rim with its folded side ring D can then be placed in position within the other beaded or wired edge of the outer cover and moved up so that the edge 23 of the detachable portion B of the rim at the division will slide on to the rabbeted edge 10 of the fixed portion A of the rim and moreover the inner flange 18 of the flanged side ring D will pass within the bonding band 19 as in Figs. 1 and 3, and can there be secured by replacing and screwing up the nuts on the bolts E.

In using my improved wheel rim above described with a wheel furnished with a wooden felly then the periphery of the felly is turned down at each side so as to form the rabbets 26 to accommodate the flanges 17, 18 and an iron or steel bonding band such as 24 Figs. 4 and 6 is shrunk around the wooden felly 25 so as to overlap the rabbeted parts and may also be further secured if desired by screws or rivets passing through the band 24 and felly 25. The flanges 17, 18 of the two parts A, B of the rim fit between the rabbeted periphery of the felly 25 and the bonding band 19 as in Fig. 4.

It is to be understood that at that part of the wheel rim through which the valve of the air tube passes there has to be a clearance hole in the band 19 large enough for the nut of the valve to pass through and to bear upon the inner portion of the part A of the rim as otherwise if the valve were arranged with its nut bearing on the bonding band 19 the screwing up of the nut might distort the wheel rim as it would tend to squeeze together the parts A, B of the rim and the bonding band 19.

What I claim is:—

1. A divisible wheel rim for pneumatic tires comprising in combination; two rim parts having a considerably decreased diameter at their adjacent edges; inturned parts forming the outer edges of the rim parts; two channel section rings fixed to and carrying the rim part, inturned flanges on said rings; a bonding band fitting within the inturned flanges; and cross members passing through said rings and detachably securing them and the rim part together; for the hereinbefore specified purpose.

2. A divisible wheel rim for pneumatic tires comprising in combination; two rim parts; two channel section rings fixed to and carrying the rim parts; inturned flanges on said rings; a rabbeted member with which the inturned flanges of the channel section rings engage; and means for detachably securing said rim part and rings in position, for the hereinbefore specified purpose.

3. A divisional wheel rim for pneumatic tires comprising in combination; two rim parts; two channel section rings fixed to any carrying the rim parts, inturned flanges on said rings, a bonding band fitting within the inturned flanges; rabbeted edges on the said band with which the inturned flanges of the channel section rings engage; and means for detachably securing said rings and rim part together; for the hereinbefore specified purpose.

4. A divisible wheel rim for pneumatic tires comprising in combination; two rim parts; two members fixed to and carrying the rim parts; engaging means on said members; a member engaged by said means and retaining said rings in spaced relation, and securing means detachably securing said rings together and in engagement with the spacing member; for the hereinbefore specified purpose.

5. A divisible wheel rim for pneumatic tires comprising in combination; two rim parts having a considerably decreased diameter at their adjacent edges; inturned parts forming the outer edges of the rim parts; two channel section rings fixed to and carrying the rims; inturned flanges on said rings; means fitting within said flanges, means engaging said flanges; cross bolts securing said rim part and rings together and said flanges in engagement, for the hereinbefore specified purpose.

6. A divisible wheel rim for pneumatic tires comprising in combination; two rim parts having a considerably decreased diameter at their adjacent edges; inturned parts forming the outer edges of the rim parts; two channel section rings fixed to and carrying the rim part; inturned flanges on said rings; a wooden felly; rabbeted edges on said felly engaged by said inturned flanges; a metal bonding band shrunk around said felly; and cross members passing through said rings and detachably securing them and the rim parts together, for the hereinbefore specified purpose.

In testimony whereof I affix my signature.

THOMAS JOHN HOBSON.